Dec. 19, 1944.  J. G. INGRES  2,365,471
BRAKE OPERATING MECHANISM
Filed June 22, 1942
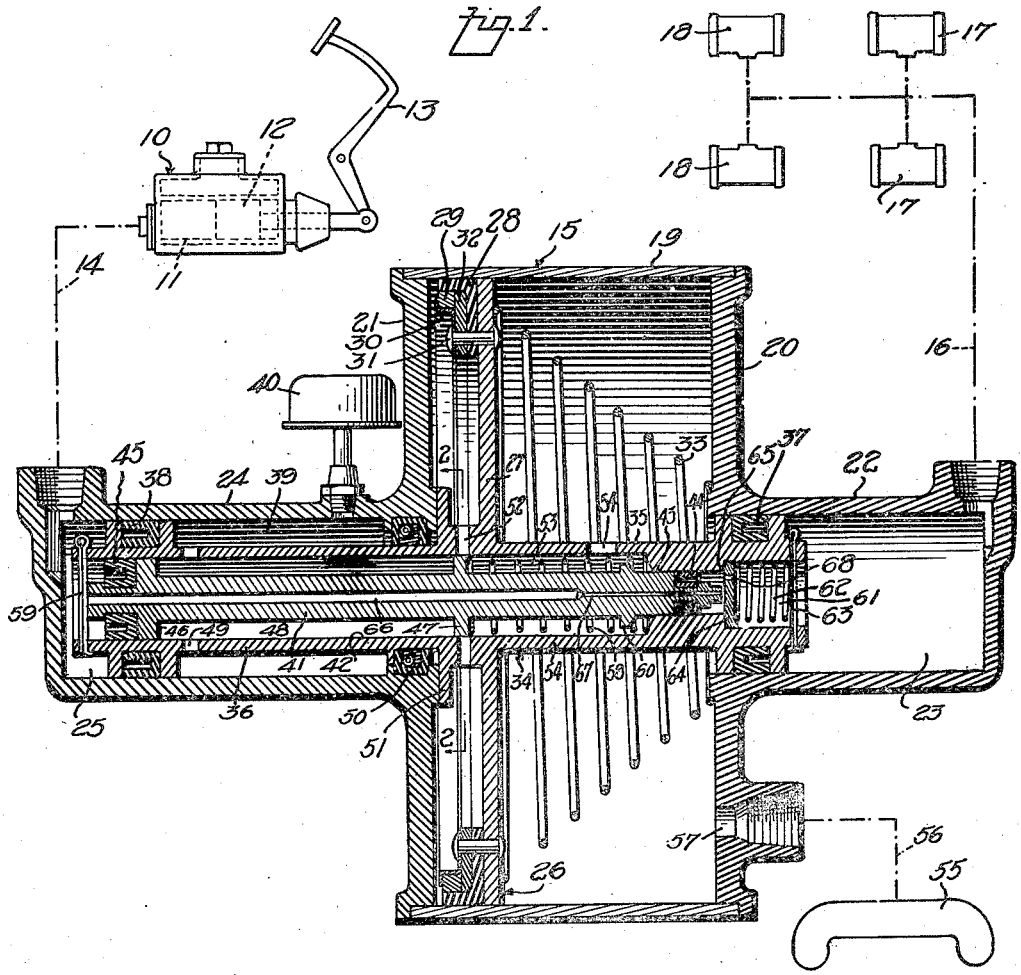
Fig. 1.
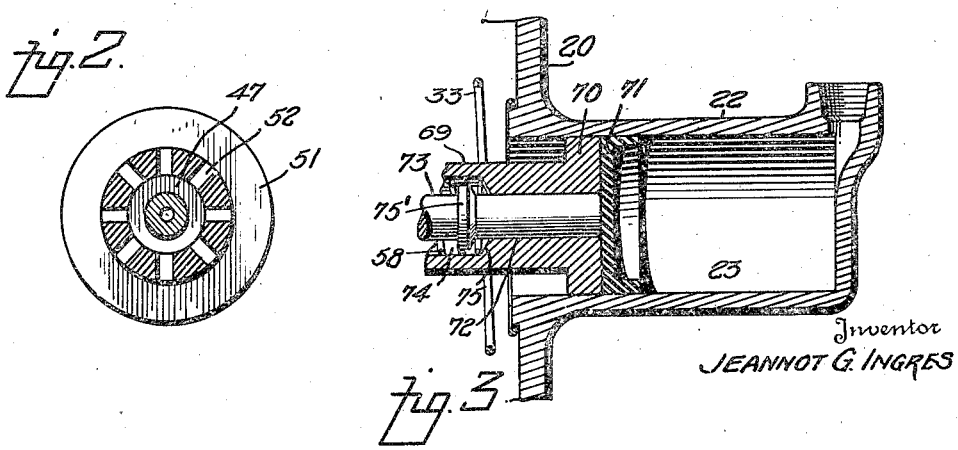
Fig. 2.
Fig. 3.
Inventor
JEANNOT G. INGRES Patented Dec. 19, 1944

2,365,471

UNITED STATES PATENT OFFICE 2,365,471

BRAKE OPERATING MECHANISM

Jeannot G. Ingres, Detroit, Mich., assignor to Automatic Shifters, Inc., Richmond, Va., a corporation of Virginia Application June 22, 1942, Serial No. 447,993

16 Claims. (Cl. 60—54.5)

This invention relates to brake operating mechanisms.

One of the serious obstacles to the use of power booster brake operating mechanisms has been the use of mechanical controlling and operating means connected between the brake pedal mechanism and the power mechanism. This has been due to the difficulty in utilizing the extremely limited spaces available for the power mechanisms and the mechanical connections for operating them. Recently there have been developed brake operating mechanisms which overcome this difficulty by eliminating the use of mechanical operating connections, the power mechanisms being operated and controlled hydraulically through the medium of pipes connected between the master cylinders of the braking systems and the power mechanisms. Such an expedient eliminates all mechanical connections leading from the brake pedal, thus permitting the power mechanism to be placed in any available space regardless of its location with relation to the brake pedal.

While hydraulically controlled power mechanisms of the type referred to are highly advantageous for the reasons stated, they possess some disadvantage in operation in that the response of the power source to the hydraulic operation of the valve mechanism is slightly sluggish, and the same is true of the cutting off of the power when movement of the brake pedal is arrested. The slight lagging of the response of the motor to movement of the brake pedal has been partially overcome by utilizing initial movement of the brake pedal for displacing from the master cylinder into the braking system sufficient brake fluid to initiate movement of the brake shoes to take up play between the brake shoes and the brake drums prior to the energization of the power device.

An important object of the present invention is to provide a highly efficient brake operating mechanism wherein all sluggishness in the operation of the power device with respect to operation of the brake pedal of a system of this character is completely eliminated, energization of the motor taking place from a practical standpoint instantaneously with the operation of the brake pedal.

A further object is to provide a novel arrangement of parts in an apparatus of this character wherein initial displacement of brake fluid from the master cylinder multiplies the relative movement of the fluid operated valve of the power device, thus providing for extremely rapid energization of the power device substantially instantaneously upon operation of the brake pedal.

A further object is to provide a novel arrangement for multiplying initial movement of the fluid-operated valve without the use of any leverage means for this purpose.

A further object is to provide a device of the character referred to wherein the multiplying of the degree of movement of the fluid-operated valve automatically ceases upon energization of the motor, the valve partaking of movement approximately equal to movement of the piston of the master cylinder as soon as operation of the power device is initiated.

A further object is to provide a control chamber into which brake fluid is displaced from the master cylinder, and to provide two elements movable by the brake fluid one connected for operation by the motor and the other, of limited diameter, immediately movable upon the flow of fluid into the chamber when the brake pedal is depressed, whereby such smaller element moves a distance relative to the distance of movement of the piston of the master cylinder which is inversely proportional to the area of such smaller element with relation to the area of the master cylinder, thus providing for an extremely rapid initial movement of such smaller element and consequently of the valve element controlled thereby.

A further object is to provide a device of this character wherein the use of any means for manually displacing brake fluid into the fluid system leading to the brake cylinder is eliminated because of the operating characteristics of the valve mechanism.

A further object is to provide such a mechanism wherein the brake pedal is provided with accurate "feel" proportional to the force being exerted in applying the brakes.

Other objects and advantages of the invention will become apparent during the course of the following description.

In the drawing I have shown two embodiments of the invention. In this showing—

Figure 1 is a central longitudinal sectional view through the power device, the brake pedal and its master cylinder, the brake cylinders for the wheels and the various piping connections being diagrammatically illustrated, Figure 2 is a transverse sectional view on line 2—2 of Figure 1, and, Figure 3 is a fragmentary central longitudinal sectional view showing a modified form of the invention.

Referring to Figure 1, the numeral 10 designates a conventional master cylinder unit of a hydraulic vehicle brake system, this unit having a cylinder 11 from which brake fluid is displaced by a piston 12 operable by the brake pedal 13. Fluid displaced from the cylinder 11 flows through a pipe 14 to operate a power mechanism indicated as a whole by the numeral 15 and referred to in detail below. Fluid is displaced from the power mechanism through a suitable pipe line diagrammatically represented in Figure 1 and indicated by the numeral 16, this pipe line having suitable branches leading to the cylinders 17 of the rear vehicle wheels and the cylinders 18 of the front vehicle wheels.

The power device 15 comprises a cylinder 19 having heads 20 and 21 each of which is provided with a preferably integral axial extension as shown in Figure 1. The extension on the head 20 is indicated by the numeral 22 and its interior space 23 constitutes a pressure chamber communicating with the pipe line 16 so that brake fluid displaced from the chamber 23 flows under pressure to the brake cylinders 17 and 18. The axial extension on the head 21 is indicated by the numeral 24 and the space within this extension at its outer end, indicated by the numeral 25, is the control chamber for the device and communicates with the conduit 14 to receive brake fluid displaced from the master cylinder.

A piston unit 26 is mounted for reciprocation in the power device. This unit comprises a disk 27 at the periphery of which is mounted a cup 28 which may be urged outwardly by an expansible ring 29 held in position by a retainer 30, rivets or the like 31 passing through the retainer, through a clamping ring 32 and through the cup 28 and disk 27 to secure these elements with respect to each other. A convolute spring 33 urges the piston unit toward the left as viewed in Figure 1.

The piston unit is provided with a sleeve indicated as a whole by the numeral 34, this sleeve having two ends 35 and 36 projecting axially to the right and left respectively of the disk 27. The end of the sleeve section 35 is mounted for reciprocation in the cylindrical chamber 23 and is provided with suitable packing 37. The end of the sleeve 36 remote from the disk 27 is reciprocable in the extension 24 and is also provided with suitable packing 38. It will be apparent that the body of the sleeve section 36 is of substantially smaller diameter than the interior of the extension 24, thus providing a space 39, and this space is open to the atmosphere preferably through a suitable air cleaner 40. The internal diameter of the extension 24 bears a definite relationship to the diameter of the cylinder 11. In actual practice these diameters are equal, the cylinder 11 in Figure 1 merely being shown diagrammatically without reference to any particular size relative to the normal diameter of the extension 24. These relative diameters are important in the practical operation of the mechanism, as will be referred to later. The internal diameter of the extension 22 is preferably equal to the internal diameter of the extension 24 so that the amount of fluid displaced from the pressure chamber 23 in the operation of the mechanism will be equal to the amount of fluid displaced from the master cylinder into the operating chamber 25, as will become apparent.

A valve plunger 41 is mounted for reciprocation in a cylindrical bore 42 formed throughout the length of the sleeve section 36 and through a portion of the sleeve section 35. Beyond the bore 42 the sleeve section 35 is provided with a smaller bore 43 in which the adjacent end of the valve plunger 41 is reciprocable. The latter end of the valve plunger is provided with suitable packing 44, while the opposite end of the valve plunger reciprocable in the bore 42, is suitably packed as at 45. The latter packing is arranged against a land 46 formed on the valve plunger and spaced a substantial distance from another valve land 47 formed on the valve plunger. The space 48 between these two lands communicates with the air space 39 through ports 49.

In order to prevent direct communication between the air space 39 and the adjacent end of the cylinder 19, suitable packing 50 is carried by the head 21 in sliding engagement with the sleeve section 36, and the latter element is provided with an annular flange 51 engaging the head 21 to limit movement of the piston unit 26 to the left as viewed in Figure 1. Between the disk 27 and flange 51 the sleeve 36 is provided with ports 52 having limited communication with the space 53 surrounding the valve plunger 41 to the right of the land 47 as viewed in Figure 1. The land 47, in the "off" position of the parts, slightly uncovers the ports 52 for the purpose stated, and the space 53 communicates with the interior of the right hand end of the cylinder 19 through a port 54 formed in the sleeve section 35.

The right hand end of the cylinder 19 is in constant communication with a source of partial vacuum such as the intake manifold 55 of the vehicle engine, a pipe 56 connected to the manifold being in fixed communication with the cylinder through a port 57 formed in the head 20. It will be apparent that when the parts are in the "off" position, therefore, the constant vacuum in the right hand end of the cylinder 19 will be established in the left hand end of this cylinder through port 54, space 53 and ports 52, thus vacuum suspending the piston unit 26.

A light spring 58 urges the valve plunger 41 to its "off" position shown in Figure 1 and its movement is limited in any suitable manner, for example, by a pin 59 extending through the left hand end of the sleeve section 36. Movement of the valve plunger in the opposite direction is limited by a flange 60 formed on the valve plunger and engageable with the adjacent end of the bore 42. Play between the flange 60 and the end of the bore 42 will be taken up for the manual operation of the piston unit and the sleeves connected thereto upon a failure of power in the power device.

A cylindrical recess 61 is formed in the right hand end of the sleeve section 35. A compression spring 62 in this recess has one end engaging a stop pin 63 and its other end urging a disk 64 into engagement with a seat 65 formed at the inner end of the recess 61. The valve plunger is provided with an axial bore 66 communicating with the control chamber 25, and the other end of the valve plunger is provided with a very restricted bore 67 extending through the right hand limit of the valve plunger. The latter end of the valve plunger, in the off position of the parts, has a slight clearance, for example 1/64" with respect to the disk 64 and engages this disk promptly upon operation of the valve plunger. Such movement will unseat the disk 64 and this element is provided with a port 68 so that the pressure of oil in the chamber 23 will be duplicated in the space to the left of the disk 64 whereby the adjacent end of the valve plunger will be subjected to such pressure to provide the "feel" in the brake pedal 13. The bores 66 and 67 provide for the replenishing of brake fluid leaking from the chamber 23, pipe line 16 and brake cylinders 17 and 18, in a manner to be described.

In Figure 3 of the drawing a modified form of the invention is shown wherein the means for replenishing leakage from the pressure end of the system is eliminated, the modified form of the device being substantially simplified. The cylinder head 20, axial extension 22 and pressure chamber 23 are identical with the forms of the invention previously described and accordingly have been indicated by the same reference numerals.

Referring to Figure 3, the numeral 69 designates a modified form of sleeve carried by the piston unit 26 in place of the sleeve 35 previously described. The sleeve 69 is provided with a head 70 reciprocable in the pressure chamber 23 and sealed with respect thereto by a cup 71 which preferably is formed of rubber, although it may be made of any suitable deformable material. The annular flange of the cup 71 slides in the extension 22 sealed against the leakage of brake fluid, and the cup completely covers the end of the head 70 and thus forms a seal for a bore 72. A valve plunger 73 is substituted for the valve plunger 41 and has its right hand end as viewed in Figure 3 slidable in the bore 72. This bore connects with an enlarged bore 74, a shoulder 75 being formed between the two bores for engagement by an annular flange 75' carried by the plunger 73. This plunger obviously is movable axially relative to the sleeve 69 and when its extremity moves to the right beyond the head 70, the central portion of the cup 71 will be deformed and the pressure against the cup 71 will react against the end of the plunger 73 to provide the brake pedal with "feel" as will be described later. The modified form of the invention is also preferably provided with the spring 58 tending to move the valve plunger toward the left to its "off" position.

The operation of the form of the invention shown in Figures 1 and 2 is as follows:

The right hand end of the cylinder 19 (Figure 1) is in fixed communication with the intake manifold 55 through a suitable pipe line 56. The valve elements are shown in their normal or "off" positions in Figure 1, and accordingly the partial vacuum in the right hand end of the cylinder will be duplicated in the opposite end of the cylinder through port 54, space 53 and ports 52, the latter being slightly uncovered by the land 47. Thus it will be apparent that the piston unit 26 will be vacuum suspended. Under the conditions referred to the spring 58 will hold the left hand end of the valve plunger 41 against the stop pin 59 and the spring 33 will hold the piston unit in its left hand limit of movement with the flange 51 in engagement with the adjacent portion of the cylinder head 21. The disk 64 will be engaged against its seat 65 with the adjacent end of the valve plunger 41 slightly clearing the disk 64, for example, by approximately 1/64", and the purpose of this clearance will be referred to later. Under the normal inoperative conditions referred to there will be no pressure above that of the atmosphere in either end of the system and the brake pedal 13 will be completely released.

When the brake is to be operated, the pedal 13 will be depressed to move the piston 12 toward the left in Figure 1 to displace fluid from the cylinder 11 through pipe line 14 into the operating chamber 25. As previously stated, the internal diameters of the extensions 22 and 24 and of the cylinder 11 are preferably equal, for a reason which will become apparent, and the cross-sectional area of the bore 42 is preferably one-third the internal cross-sectional area of the extension 24, and accordingly one-third of the cross-sectional area of the cylinder 11. If this proportion is followed in the cross-sectional area of the parts referred to any linear movement of the piston 12 will be multiplied by three in the linear movement of the valve plunger 41. Thus a ⅛" movement of the piston 12 from its normal position would effect a ⅜" movement of the valve plunger 41 to the right in Figure 1, it being noted that in the initial operation of the apparatus the piston unit 26 and the elements connected thereto are stationary.

The substantial movement of the valve plunger 41 relative to movement of the piston 12 results in instantaneous movement of the valve land 47 from its off position in Figure 1 to a position wherein the ports 52 are cut off from the vacuum space 53 and are placed in full communication with the atmosphere through the space 48, ports 49, space 39 and air cleaner 40. There will be an immediate extremely rapid increase in pressure in the left end of the cylinder 19 (Figure 1) to cause an immediate response of the piston unit to movement of the piston 12 and valve plunger 41.

Assuming that the piston 12 has been moved ⅛" and the plunger 41 ⅜", as stated above, and movement of the piston 12 is then arrested to maintain a slight application of the brakes, the energization of the motor 15 will effect movement of the plunger sleeve 35 so that its right hand end will displace fluid from the pressure chamber 23 into the braking system through the piping 16. Since the area of the valve plunger 41 is one-third of the interior cross-sectional area of the extension 24 it follows that the area of the end of the extension 36 will be two-thirds the interior cross-sectional area of the extension 24 and twice the area of the left hand end of the valve plunger 41.

Therefore it will be apparent that upon energization of the motor 15 in the manner stated, movement of the piston unit 26 toward the right will similarly move the left hand end of the extension 36 and since the plunger 12 is being maintained stationary, no brake fluid will be moving into the chamber 25 to satisfy the requirements of the space in the chamber 25 which will have been evacuated by movement of the sleeve 36. Therefore, the operation referred to results in an immediate reverse movement of the valve plunger 41 two-thirds the distance it has previously moved, such operation providing for the necessary fluid to replace the space evacuated by the end of the plunger sleeve 36. After energization of the motor 15, therefore, the valve plunger 41 will move back toward the left one-quarter inch so that its net movement is ⅛", and the brake fluid displaced by such ¼" back movement of the plunger 41 will provide for a ⅛" movement of the sleeve 36, this sleeve being double the area of the head 46, as stated.

From the foregoing it will be apparent that any movement of the piston 12 will result in exactly the same net movement of the valve plunger 41 and sleeve 36, the valve plunger first overrunning the distance of movement of the piston 12 and then moving back two-thirds of the previously moved distance after the motor has been actuated. Since the internal diameters of the extensions 22 and 24 are equal, the operation referred to will result in movement of the right hand end of the sleeve 35 to displace from the pressure chamber 23 an amount of brake fluid equal to that which has been pumped into the control chamber 25. The amount of fluid forced into the brake cylinders 17 and 18 therefore, will equal the fluid displaced from the cylinder 11, the same as if the brakes had been manually operated. However, the motor 15 will have performed most of the work in applying the brakes, thus requiring much less effort on the part of the operator.

The multiplication in the movement of the valve plunger 41 with respect to movement of the piston 12 is important for two reasons. In the first place, it provides for an extremely rapid energization of the motor so that, so far as can be detected, the motor 15 operates simultaneously with the depression of the pedal 13. In the second place, the relative areas of the ends of the plunger 41 and sleeve 36 provide for an extremely rapid cutting off of the motor when the brakes have been applied to an extent corresponding to the extent to which the brake pedal has been depressed. Reverse movement of the valve plunger 41 to the left upon energization of the motor takes place with the piston unit 26 moving toward the right, and accordingly there will be rapid relative movement between the ports 52 and land 47 to tend to restore the parts to their normal positions to cut off further energization of the motor. Thus the motor is instantaneously responsive to pedal operation and the piston unit 26 stops instantaneously upon the stopping of the movement of the pedal 13.

When the pedal 13 is stopped with the motor 15 energized the parts obviously will not return fully to their relative normal or "off" positions. If the parts were returned to such positions, vacuum suspension of the piston unit 26 would occur and the spring 33 would start to move the piston unit toward the left to slightly release the brakes. What actually happens is that in the relative movement of the parts to cut off the admission of air through ports 52 when pedal movement is stopped, the land 47 will move relatively toward the left until the admission of air is cut off, whereupon movement of the parts will be promptly arrested. Any tendency for the piston unit to move too far to the right in Figure 1 will result in very slight opening of the ports 52 to the vacuum space 53, thus immediately exhausting sufficient air from the left end of the cylinder 19 to prevent further movement of the piston unit 26 toward the right.

The slight clearance between the right hand end of the valve plunger 41 (Figure 1) and the disk 64 is taken up when the motor is energized, the land 47 always occupying a position sufficiently to the right of its relative position with respect to the ports 52 when the motor 15 is energized to slightly unseat the disk 64. Therefore, it will be apparent that always, during energization of the motor 15, the disk 64 acts as a valve closing the end of the passage 67, thus preventing leakage of brake fluid from the chamber 23 into the chamber 25.

During energization of the motor, the port 68, Figure 1, serves the function of exposing the adjacent end of the valve plunger 41 to a pressure in the chamber 23, and this pressure therefore opposes movement of the valve plunger toward the right as viewed in Figure 1 to an extent proportional to the area of the bore 43 with relation to the cross-sectional area of the extension 22. Therefore, the pedal 13 is always provided with "feel" which is substantially exactly proportional to the pressure in the chamber 23. In this connection it will be noted that the spring 68 is very light, being of only sufficient tension to tend to hold the disk 64 on its seat.

It will be apparent from the foregoing that energization of the motor takes place with a follow-up action occurring between the ports 52 and land 47, the piston unit 26 always moving approximately the same distance as the valve plunger 41. This is also true in the releasing operation, the returning of the brake pedal 13 toward its normal position resulting in the spring 58 being released to constantly move the valve plunger toward the left (Figure 1) to tend to uncover the ports 52 to the vacuum space 53. This operation tends to balance pressures in the ends of the motor so that the spring 33 will urge the piston unit toward the left, this operation being assisted by the brake fluid being returned to the pressure chamber 23 by the springs of the individual wheel cylinders 17 and 18. If the brake pedal 13 is partially released and its movement stopped, no more fluid will be displaced from the chamber 25 into the cylinder 11, and slight additional movement of the piston unit 26 toward the left will increase pressure in the chamber 25 to quickly move the valve plunger 41 to the right, thus instantaneously cutting off communication between the ports 52 and vacuum space 53 to resist movement of the piston unit 26.

After the brakes have been completely released the parts will return to the relative positions shown in Figure 1. If there has been any slight leakage of brake fluid from the pressure end of the system, there will be a slightly smaller volume of fluid in the pressure end of the system than before operation of the brakes. Under such conditions the movement of the piston unit and the valve plunger completely to their "off" positions will create a slightly lowered pressure in the pressure end of the system, whereupon braking fluid will flow through the bore 66 and passage 67 and thence through the port 62 into the pressure end of the system until the pressures are balanced in the chambers 23 and 25, and this point will be reached when the amount of fluid thus flowing into the chamber 23 exactly equals the fluid which has leaked from the pressure end of the system.

It will be noted that movement of the valve plunger 41 to the right (Figure 1) with relation to the piston unit as a whole is limited in accordance with the space between the flange or head 60 and the adjacent extremity of the bore 42. If, for any reason, the power of the motor should fail when the brake pedal is operated, the plunger 41 will move to the right to its limit of movement, whereupon the fluid pressure generated in the operating chamber 25 will move both the sleeve 36 and plunger 41 to displace fluid from the chamber 23. Attention is again invited to the fact that the cross-sectional area of the cylinder 11 and the internal cross-sectional areas of the extensions 22 and 24 are equal to each other and accordingly the manual operation of the apparatus, in the event of power failure, will be exactly the same as if the pipe 14 were directly connected to the pipe 16.

In the modified form of the invention shown in Figure 3 greater simplicity is accomplished by eliminating the means for replenishing leakage from the pressure end of the system, there being no parts in the modified form corresponding to the leakage passage 67, disk 64, etc. The cup 71 seals the bore 72 against leakage in either direction and seals against leakage from the pressure chamber 23 past the head 70. The plunger 73 otherwise is identical with the valve plunger 41, the same valve elements being provided and the plunger 73 being urged toward the left in the same manner as the plunger 41 is urged to the left in Figure 1.

The valve plunger 73 is operated upon depression of the brake pedal in the same manner that the plunger 41 is operated and its movement to the right is permitted by the deformability of the cup 71. This operation is provided solely for the purpose of utilizing pressure in the chamber 23 to react against the adjacent end of the valve plunger 73 to resist movement of the brake pedal and thus provide the latter with "feel."

In previous mechanisms of the same general type as the present one, some sluggishness has been experienced both in the energizing of the motor and in the arresting of the movement of the piston when movement of the brake pedal is stopped. In some of these prior structures sluggish response of the motor to initial movement of the brake pedal has been partially overcome by utilizing initial movement of the brake pedal in one way or another to manually displace fluid into the pressure end of the braking system to take up play between the brake shoes and the brake drums so that this much of the operation can be accomplished prior to energization of the motor so that a lagging in the energization of the motor is a less serious problem than it otherwise would be. In some prior constructions the result referred to is accomplished by initially by-passing some of the brake fluid from the inlet end of the mechanism to the outlet end thereof upon depression of the brake pedal, but when this is done, the pressure operation of the valve does not take place until after play has been taken up between the brake shoes and brake drums. Therefore, such a system, while displacing fluid at the same rate in the pressure end of the system as it is displaced from the master cylinder, is of little practical use since it merely conditions the brake shoes for operation and the sluggishness of the motor is not overcome. In another type of prior mechanism, the valve plunger itself enters the pressure chamber to displace fluid therefrom upon operation of the valve. Such an arrangement is advantageous over the other type referred to in that it tends to initially take up play between the brake shoes and brake drums at the same time the valve mechanism is operated, thus reducing the effect of the sluggishness in the response of the motor. However, this is not sufficient to wholly overcome sluggishness in motor response since no more rapid operation of the valve mechanism is provided and the amount of fluid forced into the pressure end of the system is substantially less than the amount of fluid displaced from the master cylinder.

With the arrangement employed in the present device it is unnecessary either to initially by-pass brake fluid from the master cylinder into the braking system and it is likewise unnecessary to displace brake fluid by operation of the valve itself. All tendency toward sluggishness in operation is removed by providing the arrangement shown wherein the rate of movement of the valve plunger is substantially multiplied with respect to movement of the piston of the master cylinder whereby very slight operation of the brake pedal provides a wide-open communication between one end of the motor and the source of pressure differential to provide an instantaneous response of the motor to movement of the brake pedal. The same rapid relative movement of the parts is provided when movement of the brake pedal is arrested, the piston unit 26 and the valve plunger moving relatively in opposite directions to provide an instantaneous cut off under such conditions. It will be obvious that the relation between the area of the left hand end of the plunger 41 (Figure 1) to the internal cross-sectional area of the extension 24 may be designed in accordance with individual desires or requirements so that any ratio of movement of the plunger 41 to the piston 12 may be provided. In actual operation the three to one ratio referred to has been found highly desirable and provides for substantially instantaneous energization and deenergization of the motor when the brake pedal 13 is respectively moved and stopped. The device at the same time provides highly sensitive "feel" and it will be obvious that the proportionate resistance to the movement of the brake pedal may be designed as desired in accordance with the relative cross-sectional areas of the bore 43 and pressure chamber 23.

While the motor is designed to provide vacuum suspension in the "off" position of the parts, it will be apparent that any balanced pressures may normally be present in opposite ends of the motor 15. The feature of providing relatively rapid movement of the valve makes the motor extremely sensitive in its operation regardless of what type of balanced pressure is employed, but vacuum suspension as illustrated, is preferred for the reason that it has been found to render the motor even more highly sensitive in operation. It also will be noted that the high rate of movement of the valve plunger relative to movement of the piston 12 is accomplished without the use of any lever means whatever and that the movement of the valve plunger is restored to one ratio automatically when the motor becomes energized and the piston unit starts to move.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A brake operating mechanism for a hydraulic vehicle brake system having hydraulic brake cylinders for the vehicle wheels and a master cylinder having a pedal-controlled piston therein, comprising a control chamber communicating with the master cylinder, a pressure chamber communicating with the brake cylinders, power means for displacing fluid from said pressure chamber into the brake cylinders and having a power-movable portion projecting into said control chamber, and control means for said power means comprising an element subject to movement by fluid displaced into said control chamber from the master cylinder, said control means having a portion exposed to pressure in said pressure chamber to oppose movement of said control means by fluid in said control chamber.

2. A brake operating mechanism for a hydraulic vehicle brake system having hydraulic brake cylinders for the vehicle wheels and a master cylinder having a pedal-controlled piston therein, comprising a control chamber communicating with the master cylinder, a pressure chamber communicating with the brake cylinders, power means for displacing fluid from said pressure chamber into the brake cylinders and having a power-movable portion projecting into said control chamber, and control means for said power means comprising a plunger having one end thereof open to the pressure of fluid in said control chamber to be moved by fluid displaced thereinto from the master cylinder, the other end of said plunger being exposed to pressure in said pressure chamber to oppose movement of said plunger by fluid in said control chamber.

3. A brake operating mechanism for a hydraulic vehicle brake system having hydraulic brake cylinders for the vehicle wheels and a master cylinder having a pedal-controlled piston therein, comprising a control chamber communicating with the master cylinder, a pressure chamber communicating with the brake cylinders, power means for displacing fluid from said pressure chamber into the brake cylinders and having a power-movable portion projecting into said control chamber, and a follow-up control mechanism for said power means comprising a pair of elements one of which is movable with the power means and the other of which is subject to movement by fluid displaced into said control chamber from the master cylinder, said second named element having a portion exposed to pressure in said pressure chamber to oppose movement of such element by fluid in said control chamber.

4. A brake operating mechanism for a hydraulic vehicle brake system having hydraulic brake cylinders for the vehicle wheels and a master cylinder having a pedal-controlled piston therein, comprising a control chamber communicating with the master cylinder, a pressure chamber communicating with the brake cylinders, a power device, a piston operated by said power device and reciprocable in said pressure chamber to displace fluid therefrom into the brake cylinders, said power device having a power-movable portion projecting into said control chamber, and control means for said power device comprising a control element subject to operation by fluid displaced into said control chamber from said master cylinder, said control means having a portion exposed to pressure in said pressure chamber to oppose movement of said control element by fluid in said control chamber.

5. A brake operating mechanism for a hydraulic vehicle brake system having hydraulic brake cylinders for the vehicle wheels and a master cylinder having a pedal-controlled piston therein, comprising a control chamber communicating with the master cylinder, a pressure chamber communicating with the brake cylinders, a power device, a piston operable by said power device and reciprocable in said pressure chamber, said power device having a power-movable portion projecting into said control chamber, and a follow-up control mechanism for said power device comprising a pair of elements one of which is operable in accordance with movement of said second named piston and the other of which is operable by fluid displaced into said control chamber from said master cylinder, said second named element having a portion exposed to pressure in said pressure chamber to oppose movement of such element by fluid in said control chamber.

6. A brake operating mechanism for a hydraulic vehicle brake system having hydraulic brake cylinders for the vehicle wheels and a master cylinder having a pedal-controlled piston therein, comprising a control chamber communicating with the master cylinder, a pressure chamber communicating with the brake cylinders, a differential pressure operated power device having a pressure movable member comprising a piston reciprocable in said pressure chamber to displace fluid therefrom to said cylinders, said power device having a power-movable portion projecting into said control chamber, and a valve mechanism controlling energization of said power device and comprising a pair of elements one of which forms a part of said pressure movable member and the other of which is a control element movable relative to said first named element to connect one end of said power device to a source of pressure differential, the second named element having a portion subject to operation by fluid displaced into said control chamber from said master cylinder and a portion exposed to pressure in said pressure chamber to oppose movement of said control element by fluid in said control chamber.

7. A brake operating mechanism for a hydraulic vehicle brake system having hydraulic brake cylinders for the vehicle wheels and a master cylinder having a pedal-controlled piston therein, comprising a control chamber communicating with the master cylinder, a pressure chamber communicating with the brake cylinders, a differential pressure operated power device having a pressure movable member comprising a piston reciprocable in said pressure chamber to displace fluid therefrom to said cylinders, and a valve mechanism controlling energization of said power device and comprising a pair of elements one of which forms a part of said pressure movable member and the other of which is a control element movable relative to said first named element to connect one end of said power device to a source of pressure differential, the second named element having a portion subject to operation by fluid displaced into said control chamber from said master cylinder, and a plunger movable in accordance with movement of said pressure movable member and surrounding said second named element and projecting into said control chamber.

8. A brake operating mechanism for a hydraulic vehicle brake system having hydraulic brake cylinders for the vehicle wheels and a master cylinder having a pedal-controlled piston therein, comprising a control chamber communicating with the master cylinder, a pressure chamber communicating with the brake cylinders, a differential pressure operated power device having a pressure movable member comprising a piston reciprocable in said pressure chamber to displace fluid therefrom to said cylinders, and a valve mechanism controlling energization of said power device and comprising a pair of elements one of which forms a part of said pressure movable member and the other of which is a control element movable relative to said first named element to connect one end of said power device to a source of pressure differential, the second named element having a portion subject to operation by fluid displaced into said control chamber from said master cylinder, and a plunger movable in accordance with movement of said pressure movable member and surrounding said second named element and projecting into said control chamber, the cross-sectional areas of said master cylinder and said pressure chamber, and the sum of the areas of said plunger and said second named element being approximately equal to each other.

9. A brake operating mechanism for a hydraulic vehicle brake system having hydraulic brake cylinders for the vehicle wheels and a master cylinder having a pedal-controlled piston therein, comprising a control chamber and a pressure chamber in axial alinement and communicating respectively with the master cylinder and with the brake cylinders, and power means disposed between said chambers and comprising a piston movable in one direction in said pressure chamber to displace fluid into said brake cylinders, said power means having a power-movable portion projecting into said control chamber, and a control element for energizing the power device movable in accordance with displacement of fluid from said master cylinder into said control chamber, and means operable when said power device is deenergized for effecting a flow of fluid from said control chamber into said pressure chamber to replace fluid leaking from the latter chamber.

10. A brake operating mechanism for a hydraulic vehicle brake system having hydraulic brake cylinders for the vehicle wheels and a master cylinder having a pedal-controlled piston therein, comprising a control chamber and a pressure chamber in axial alinement and communicating respectively with said master cylinder and said brake cylinders, a power device having a piston movable in one direction in said pressure chamber upon energization of said power device to displace fluid into said brake cylinders, said power device having a power-movable portion projecting into said control chamber, a control element movable in the same direction to energize said power device and having a portion subject to operation by fluid displaced into said pressure chamber from said master cylinder, spring means urging said power-movable portion in the other direction, spring means moving said control element in the other direction, said control element and said piston having communicating passages for the flow of fluid from said control chamber to said pressure chamber when said power-movable portion and said control element are moved to their limit in said other direction, and means for stopping communication through said passages upon movement of said control element in the first named direction.

11. A brake operating mechanism for a hydraulic vehicle brake system having hydraulic brake cylinders for the vehicle wheels and a pedal-controlled piston therein, comprising a control chamber and a pressure chamber in axial alinement and communicating respectively with the master cylinder and with the brake cylinders, a power device comprising a sleeve having its ends projecting axially into the respective chambers, the portion of the sleeve in said pressure chamber constituting a piston for displacing fluid therefrom and the portion of the sleeve in said control chamber comprising a plunger, and means cooperating with said sleeve for energizing said power device and comprising a control element slidable in the second named end of said sleeve to be operated by fluid displaced from said master cylinder into said control chamber.

12. Apparatus constructed in accordance with claim 11 wherein said control element has a passage through which fluid may flow from said control chamber to said pressure chamber to replace fluid leaking from the latter, and means cooperating with said passage to close it upon movement of said control element by fluid displaced into said control chamber from said master cylinder.

13. Apparatus constructed in accordance with claim 11 wherein the other end of said control element is subject to pressures in said pressure chamber and is of an area substantially smaller than the cross-sectional area of said pressure chamber whereby movement of said control element upon operation of the pedal is resisted to an extent less than and proportional to pressures in said pressure chamber.

14. A brake operating mechanism for a hydraulic vehicle brake system having hydraulic brake cylinders for the vehicle wheels and a pedal-controlled piston therein, comprising a control chamber and a pressure chamber in axial alinement and communicating respectively with the master cylinder and with the brake cylinders, a differential fluid pressure operated power device having a pressure movable unit therein comprising a sleeve one end of which constitutes a piston movable in one direction in said pressure chamber to displace fluid therefrom and the other end of which constitutes a plunger projecting into said control chamber, and a follow-up control valve mechanism for said power device comprising a control valve element, said sleeve being ported to cooperate with said element to connect said power device to a source of pressure differential to effect movement of said sleeve in said direction upon movement of said valve element in the same direction, one end of said valve element being movable by fluid entering said control chamber from said master cylinder and being of substantially smaller area than the cross-sectional area of said master cylinder to be moved to an extent greater than movement of the piston in the master cylinder.

15. Apparatus constructed in accordance with claim 14, wherein the cross-sectional areas of said master cylinder, said pressure chamber and said control chamber are approximately equal.

16. Apparatus constructed in accordance with claim 14 wherein one end of said power device is in constant communication with a source of partial vacuum and wherein said pressure movable unit and said valve element are normally arranged in inoperative positions in which the ends of said power device are in communication with each other.

JEANNOT G. INGRES.